United States Patent [19]
Kerr et al.

[11] 3,820,772
[45] June 28, 1974

[54] ENERGY ABSORBING UNIT
[75] Inventors: Lamar L. Kerr, Centerville; James M. Pees, Dayton; Robert J. Riner, Centerville, all of Ohio
[73] Assignee: General Motors Corporation, Detroit, Mich.
[22] Filed: Nov. 24, 1972
[21] Appl. No.: 309,261

[52] U.S. Cl. ................ 267/116, 293/1, 293/9, 293/24, 293/60, 293/70, 293/73, 293/85, 293/86, 293/89, 213/43, 213/223
[51] Int. Cl. ................................. F16f 5/00
[58] Field of Search .......... 203/1, 9, 24, 60, 70, 73, 203/85, 86, 89, DIG. 2; 267/64 R, 116, 139, 140; 213/43, 223

[56] References Cited
UNITED STATES PATENTS
3,147,966  9/1964  Axthammer et al. ............. 267/64
3,700,273  10/1972  Jackson et al. .................. 267/139

FOREIGN PATENTS OR APPLICATIONS
1,280,548  11/1961  France ..................... 293/DIG. 2

Primary Examiner—James B. Marbert
Attorney, Agent, or Firm—Saul Schwartz

[57] ABSTRACT

An improved energy absorbing unit of the hydropneumatic type wherein the rate at which the unit returns to a fully extended condition after an impact stroke is retarded, the unit including a piston tube subassembly telescopically disposed on a cylinder tube subassembly, a metering pin on the cylinder tube subassembly adapted for cooperation with an aperture on the piston tube subassembly in defining a primary orifice for throttling the flow of working fluid thereby to effect energy absorption during telescopic collapse of the unit, and a flexible valve disc on the piston tube subassembly adapted to normally seal against the metering pin except during telescopic collapse of the piston tube subassembly when the pressure of the working fluid distends the valve disc. When the valve disc is sealed against the metering pin, as during telescopic extension of the piston tube subassembly, the working fluid is directed through secondary throttling orifices which function to retard the rate of telescopic extension.

2 Claims, 6 Drawing Figures

PATENTED JUN 28 1974 3,820,772

ENERGY ABSORBING UNIT

This invention relates generally to collapsible, self-restoring energy absorbing units and more particularly to a unit wherein the rate of restoration is retarded.

The primary feature of this invention is that it provides an improved energy absorbing unit, the unit being particularly adapted for supporting a collision bumper bar on an automobile vehicle body. Another feature of this invention is that it provides an improved energy absorbing unit of the hydropneumatic type including a pair of telescopically related tubes, a fixed piston on one tube cooperating with a metering pin on the other tube in providing a variable area orifice for throttling the flow of a working fluid during relative telescopic collapse between the tubes, and a free piston defining a gas chamber in which a gas is compressed during collapse of the unit to provide sufficient potential energy for effecting restoration or relative telescopic extension between the tubes. Yet another feature of this invention resides in the provision in the improved unit of a valve member adapted to retard the rate of relative telescopic extension between the tubes. Still another feature of this invention resides in the provision in the improved unit of a valve member which cooperates with the metering pin in retarding the rate of relative telescopic extension between the tubes by directing the flow of working fluid through a plurality of secondary throttling orifices. A further feature of this invention is that it provides an improved energy absorbing unit wherein the valve member is a flexible disc having a central aperture adapted for sealing engagement on the metering pin, the valve disc being supported on the fixed piston so that the pressure of the working fluid during collapse of the unit distends the aperture to permit passage of the fluid while similar reverse fluid flow is prevented by the disc which seals against the metering pin during telescopic extension thereby to positively direct the working fluid through secondary throttling orifices. A still further feature of this invention, in one particular embodiment, resides in the provision of a valve disc having an upturned lip around the aperture, the upturned lip being responsive to the pressure of the working fluid to effect an even tighter seal against the metering pin thereby to more positively direct the working fluid through the secondary throttling orifices.

These and other features of this invention will be readily apparent from the following specification and from the drawings wherein.

Figure 1:
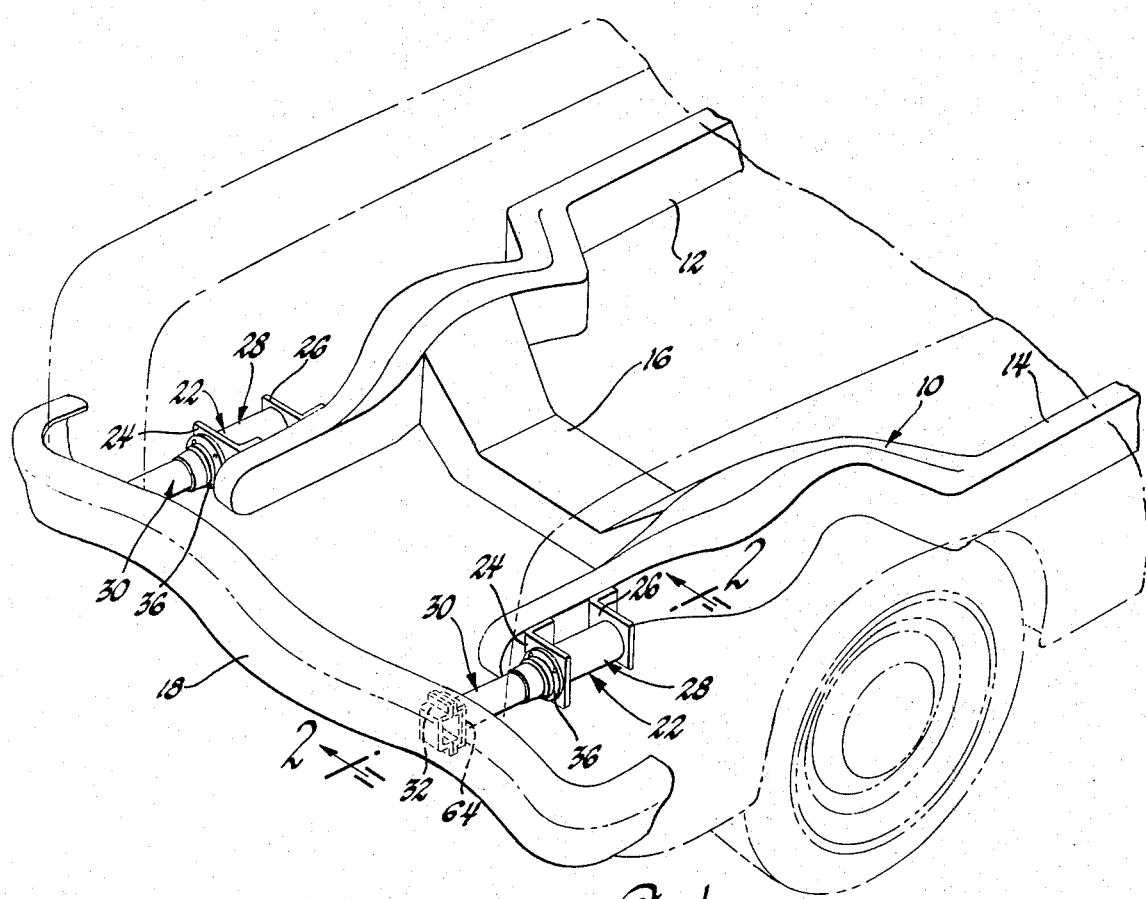
FIG. 1 is a perspective view of the forward portion of an automobile frame having a collision bumper structure supported thereon by a pair of energy absorbing units according to this invention.

Referring now to the drawings, FIG. 1 depicts in simplified form an automobile frame designated generally 10 including a pair of longitudinally extending side rails 12 and 14, the side rails being interconnected at the forward end of the frame by a rigid cross member 16. A collision bumper structure 18, including a bumper bar 20, is supported on the frame by a pair of identical energy absorbing units according to this invention designated generally 22, eac unit 22 being rigidly attached to the corresponding one of the frame rails 12 and 14 by a front bracket 24 and a rear bracket 26. It will be understood, of course, that rather than the separate frame illustrated herein the energy absorbing units according to this invention are equally well adapted for use with unibody vehicle constructions.

Figure 2:
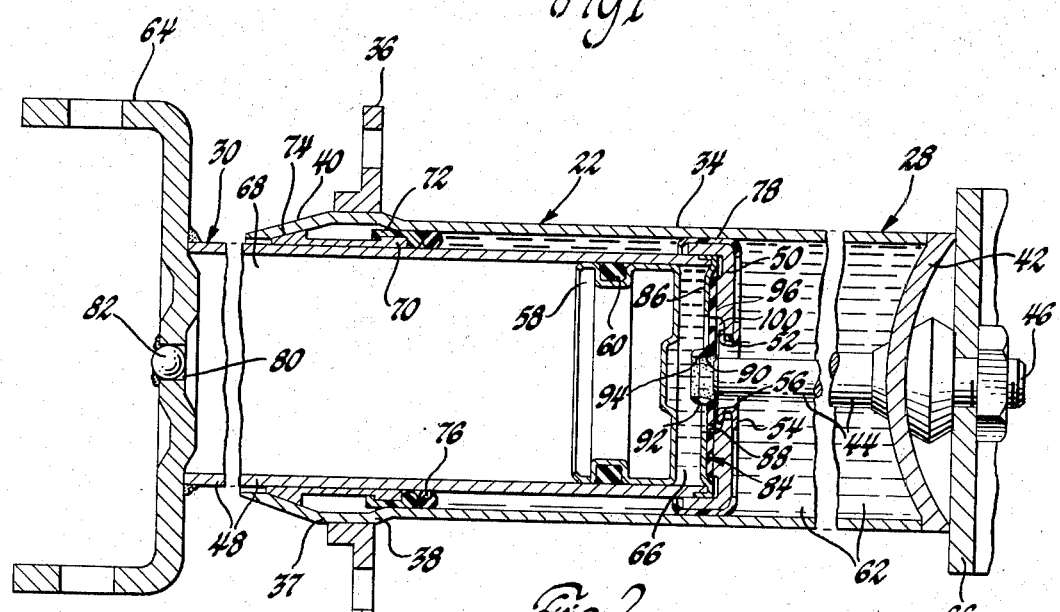
FIG. 2 is an enlarged sectional view taken generally along the plane indicated by lines 2—2 in FIG. 1 and showing the unit in a fully extended condition.

As seen best in FIGS. 1 and 2, the energy absorbing units 22 are identical and each includes a cylinder tube subassembly 28 having telescopically disposed thereon a piston tube subassembly 30, the forward end of each piston tube subassembly being attached to the bumper bar 20 by a suitable bracket 32. With the bumper bar and energy absorbing units so mounted, any impact forces applied to the bumper bar are transmitted through the energy absorbing units to the vehicle frame, the units being adapted in a manner well known in the art to collapse or displace rearwardly and present a controlled resistance during such displacement to the applied forces thereby serving to dampen or dissipate the kinetic energy of such forces. The displacement, of course, is accompanied by inward telescopic collapse of the piston tube subassembly and the bumper bar relative to the cylinder tube subassembly and the frame.

Referring particularly now to FIG. 2, the cylinder tube subassembly 28 includes a cylinder 34 having welded adjacent its open end a bracket 36 adapted for connection to the front bracket 24 on the frame 10. Generally adjacent the open end of the cylinder tube subassembly 28, the cylinder 34 includes a large diameter portion 37 flanked on opposite sides by a transitional frustoconical portion 38 between the large and small diameter portions of the cylinder 34 and a similarly frustoconical crimp stop portion 40. The rightward or inboard end of the cylinder 34 is closed by a cap 42 rigidly attached to the cylinder, as by welding. Interiorly of the unit, a metering pin 44 is rigidly attached to the cap 42 while exteriorly of the unit the cap has rigidly attached thereto a mounting stud 46 adapted for reception in an aperture in the bracket 26 and threaded so as to receive a nut thereon for attachment to the bracket.

Figure 3:
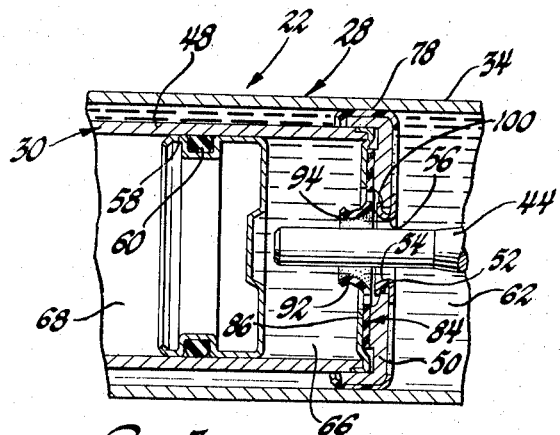
FIG. 3 is an enlarged view of a portion of FIG. 2 showing the valve in the condition thereof corresponding to telescopic collapse of the unit.
Figure 4:
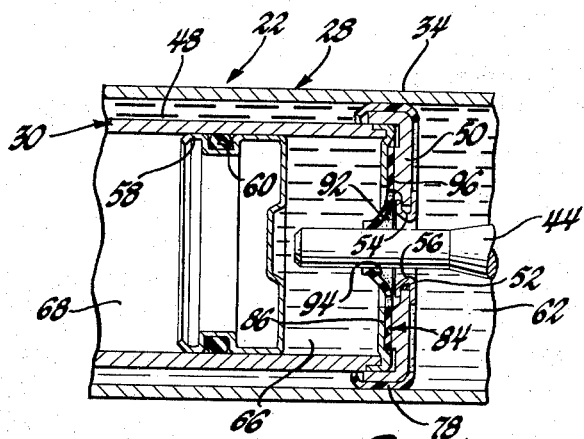
FIG. 4 is similar to FIG. 3 but showing the valve in the condition thereof corresponding to telescopic extension of the unit.

As seen best in FIGS. 2, 3 and 4, the piston tube subassembly 30 includes a cylinder 48 having a piston end wall 50 rigidly attached thereto. The end wall 50 includes a bore 52 in which is received a radially slidable annular element 54, the element 54 cooperating with the metering pin in defining an annular, variable area, primary orifice 56. A gas piston 58 is slidably received within the cylinder 48 and is provided with a suitable O-ring or like seal as at 60. The piston end wall 50 cooperates with the cylinder 34 and the cap 42 in defining a primary chamber 62 while the gas piston 58 cooperates with the piston end wall 50 and a clevis 64, welded to and sealingly closing the outboard end of tube 48, in defining a secondary chamber 66 and a gas chamber 68. An annular stop ring 70 is rigidly attached, as by welding, to the cylinder 48 and includes a raised land over which is received a nylon bearing ring 72. The stop ring further includes a stop portion defining a frustoconical surface 74. An O-ring 76 is received over the cylinder 30 and abutted with an overlap portion of the bearing ring 72. The bearing ring 72 cooperates with a similar bearing ring 78 disposed on the piston end wall 50 in supporting the piston tube subassembly on the cylinder tube subassembly for relatively smooth telescopic sliding movement.

Referring to FIGS. 2, 3 and 4, the primary and secondary chambers 62 and 66 are completely filled with an incompressible working fluid, as for example conventional hydraulic fluid, and the gas chamber 68 is filled with a pressurized gas, the gas being introduced through a port 80 in the clevis 64 which is eventually sealed by a ball 82 welded in the port. The gas forces the piston 58 rightwardly thereby to expel the working fluid from the secondary chamber 66 through the primary orifice 56 and into the primary chamber 62 while at the same time effecting telescopic extension of the piston tube subassembly relative to the cylinder tube subassembly in a well known manner to a fully extended position, FIG. 2, wherein the stop surface 74 engages the stop portion 40. Conversely, impact forces on the bumper bar 20 are transmitted through the clevis 64 to the piston tube subassembly 30 effecting rightward telescopic displacement or collapse thereof relative to the cylinder tube subassembly during which collapse the working fluid is expelled from the primary chamber 62, through the primary orifice 56, and into the secondary chamber 66. As the piston tube subassembly collapses, the metering pin 44 projects further into and through the primary orifice 56 thereby restricting or throttling the flow of working fluid through the orifice to effect primary energy dissipation or absorption. As the working fluid is expelled from the primary chamber, the volume of the secondary chamber increases thereby forcing the piston 58 leftwardly relative to the cylinder 48 to compress the gas in the gas chamber. The compressed gas thereafter functions as a spring to return the piston tube subassembly to the fully extended position when the impact force on the bumper bar ceases.

As seen best in FIGS. 2 through 6, the energy absorbing unit 22 further includes a valve arrangement for restricting the flow of the working fluid from the secondary chamber 66 to the primary chamber 62 under the influence of the compressed gas in the chamber 68 during telescopic extension of the piston tube subassembly. More particularly, the valve arrangement includes a valve disc 84 and an annular retainer 86. The valve disc 84 is fabricated from a relatively stiff but still flexible material, as for example polyurethane, and includes a pair of diametrically opposed secondary throttling orifices 88 and a centrally located circular aperture 90 surrounded by an integral upturned lip 92 having an internal surface portion 94. The outside diameter of the disc 84 is somewhat smaller than the diameter of the tube 48. The outside diameter of the retainer 86, however, is generally equal to the diameter of the tube so that when the retainer is disposed between the piston end wall 50 and the edge of the tube 48 the retainer is tightly captured and thereby rigidly attached to the piston tube subassembly. The retainer, of course, functions to rigidly secure the valve disc 84 on the piston tube subassembly within the secondary chamber 66 and with the aperture 90 in substantial alignment with the circular aperture defined by the annular element 54.

Figure 5:
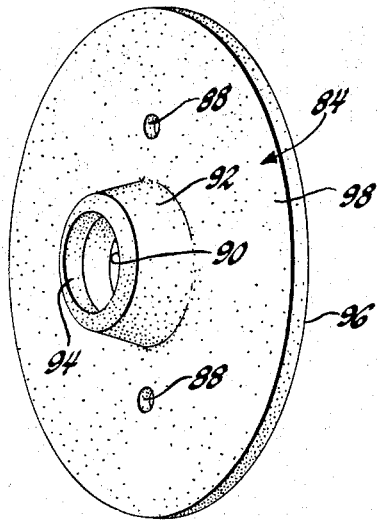
FIG. 5 is an enlarged perspective view of the valve.

As seen best in FIGS. 2, 3 and 5, the retainer overlies or captures only an annular portion of the disc 84 thus leaving the central portion surrounding the lip 92 relatively unrestrained. More particularly, with the valve disc 84 being supported on the piston end wall within the secondary chamber 66 and the unit 22 in the fully extended condition, the area of the primary throttling orifice 56 is maximum so that the rightward face or surface 96 of the disc is initially exposed to substantially the pressure of the working fluid within the primary chamber 62. Similarly, the leftward face or surface 98 of the valve disc is exposed to the pressure of the working fluid in the secondary chamber 66. Further, the secondary throttling orifices 88 disposed on opposite sides of the upturned lip 92 overlie a circular depression 100 in the piston end wall 50 which depression provides communication between the secondary throttling orifices and the primary throttling orifice 56 around the edge of the annular element 54. To further insure such communication, for purposes explained more fully hereinafter, the edge of the annular element 54 facing the valve disc may be coined or otherwise recessed at several locations.

Referring now to FIGS. 2, 3 and 4, and describing a typical operational sequence of the unit 22, in the normal fully extended position of the piston tube subassembly, FIG. 2, pressure equilibrium exists in the primary and secondary chambers 62 and 66 and the valve disc assumes a generally planar configuration due to the natural tendency of the valve material to assume its molded configuration. When the bumper is impacted and forced rearwardly, the piston end wall 50 collapses the primary chamber 62 thus rapidly increasing the pressure of the working fluid therein as well as initiating flow of the fluid through the primary throttling orifice 56 toward the secondary chamber. Simultaneously, of course, the metering pin projects progressively further through the aperture in the annular element 54. Since the valve disc 84 is both flexible and intially exposed to the pressure of the working fluid in the primary chamber, such pressure is effective to distend the unrestrained central portion of the disc leftwardly, FIG. 3, thereby achieving an expansion of the aperture 90 in the disc to permit unrestrained flow of working fluid into the secondary chamber. Accordingly, collapse of the unit 22 proceeds normally in the energy absorbing mode.

When the impact on the bumper bar terminates, the pressure of the gas in the chamber 66 urges the gas piston 58 rightwardly and places the working fluid in the secondary chamber under pressure. Accordingly, the fluid tends to flow back between the lip 92 of the valve disc and the metering pin toward the primary throttling orifice and the primary chamber 62. The pressure of the working fluid in the secondary chamber, however, also acts on the leftward face 98 of the disc and on the exterior of the lip 92 and urges the disc back to its normal, undistended configuration and the surface portion 94 of the lip to seal against the metering pin. Thus, the working fluid is effectively blocked against normal return and is positively directed through the secondary throttling orifices 88.

The secondary throttling orifices are sized to effect a pressure drop between the secondary and primary chambers to retard the rate of extension of the piston tube subassembly. After the returning working fluid passes through the secondary orifices it flows into the depression 100, around the edge of the annular element 54, and through the primary throttling orifice into the primary chamber. During this relative telescopic extension phase of operation there is no significant pressure drop across the primary throttling orifice so that the latter is, in effect, inoperative. Simultaneously, of course, the metering pin withdraws from the aperture 90 in the valve disc until the fully extended position of the piston tube subassembly is achieved. During withdrawal, the flexibility of the disc cooperates with the pressure of the working fluid in maintaining a constant, tight seal between the metering pin and the surface portion 94 of the lip 92 so that substantially all of the working fluid is directed through the secondary throttling orifices.

Figure 6:
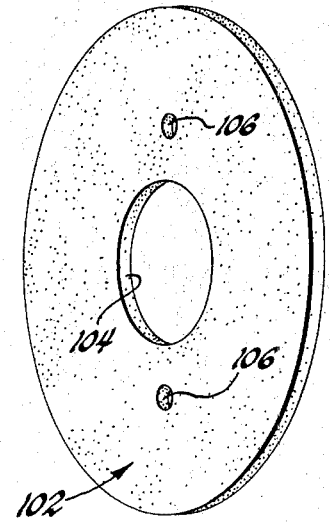
FIG. 6 is an enlarged perspective view of a modified valve.

Referring now to FIG. 6, there is shown a modified valve disc 102 in the form of a flat annulus having a central aperture 104 and a pair of secondary throttling orifices 106. The modified disc 102 is fabricated of a stiff but flexible material, as for example polyurethane, and is adapted for attachment to the piston end wall 50 as described with respect to valve disc 84. Modified disc 102 differs from disc 84 in that it does not include the lip 92. The aperture 104 in the modified disc, however, is smaller than the aperture 90 in disc 84 and, in fact, is sized to effect sealing engagement on the tapered metering pin virtually as soon as the latter begins projection into the aperture in the annular element 54.

In operation, the modified disc 102 functions in a manner almost identical to disc 84. That is, during telescopic collapse of the piston tube subassembly 30, the pressure of the working fluid distends the modified disc to prevent sealing of the marginal edge of the aperture 104 on the metering pin thereby to permit substantially unobstructed flow of working fluid into the secondary chamber. When the impact ceases, however, the pressure of the working fluid in the secondary chamber 66 urges the modified disc 102 back to its normal, planar configuration. In this configuration, the marginal edge of the aperture 104 seals against the metering pin to positively direct all of the working fluid through the secondary throttling orifices 106 for retarding the rate of telescopic extension of the piston tube subassembly. As with the valve disc 84, the pressure of the working fluid maintains the seal between the modified disc 102 and the metering pin during substantially the entire telescopic extension phase of operation of the unit 22.

Having thus described the invention, what is claimed is:

1. In a hydropneumatic energy absorbing unit of the type including a cylinder tube subassembly, a piston tube subassembly disposed on said cylinder tube subassembly for relative telescopic collapse and extension, and a tapered metering pin having a circular cross-sectional configuration rigidly attached to said cylinder tube subassembly for cooperation with a circular aperture in said piston tube subassembly in defining an annular primary throttling orifice for a working fluid disposed in a primary chamber in said cylinder tube subassembly, said working fluid being expelled from said primary chamber through said primary throttling orifice into a secondary chamber in said piston tube subassembly during telescopic collapse of the latter and from said secondary chamber into said primary chamber during telescopic extension of said piston tube subassembly, the improvement comprising, a flexible valve disc having a planar configuration and including a centrally located circular aperture and a pair of secondary throttling orifices, means rigidly attaching the periphery of said valve disc to said piston tube subassembly within said secondary chamber and with said valve disc circular aperture in alignment with said piston tube subassembly circular aperture so that said metering pin projects through said aligned apertures and one surface of said valve disc is exposed generally to the pressure of said working fluid in said primary chamber and the opposite surface thereof is exposed to the pressure of said working fluid in said secondary chamber, the pressure of said working fluid in said primary chamber being operative to distend said valve member during telescopic collapse of said piston tube subassembly and the pressure of said working fluid in said secondary chamber being operative to effect sealing engagement between the marginal edge of said valve member aperture and said metering pin during telescopic extension of said piston tube subassembly, and means defining a flow passage between said secondary throttling orifices and said primary throttling orifice, said working fluid being positively directed through said secondary throttling orifices during telescopic extension of said piston tube subassembly thereby to retard the rate of telescopic extension.

2. In a hydropneumatic energy absorbing unit of the type including a cylinder tube subassembly, a piston tube subassembly disposed on said cylinder tube subassembly for relative telescopic collapse and extension, and a tapered metering pin having a circular cross-sectional configuration rigidly attached to said cylinder tube subassembly for cooperation with a circular aperture in said piston tube subassembly in defining an annular primary throttling orifice for a working fluid disposed in a primary chamber in said cylinder tube subassembly, said working fluid being expelled from said primary chamber through said primary throttling orifice into a secondary chamber in said piston tube subassembly during telescopic collapse of the latter and from said secondary chamber into said primary chamber during telescopic extension of said piston tube subassembly, the improvement comprising, a flexible valve disc having a generally planar configuration and including a secondary throttling orifice and a centrally located circular aperture surrounded by an integral upturned lip, means rigidly attaching the periphery of said valve disc to said piston tube subassembly within said secondary chamber and with said valve disc circular aperture in alignment with said tube subassembly circular aperture so that said metering pin projects through said aligned apertures and one surface of said valve disc is exposed generally to the pressure of said working fluid in said primary chamber and the opposite surface thereof and said integral lip are exposed to the pressure of said working fluid in said secondary chamber, the pressure of said working fluid in said primary chamber being operative to distend said valve member during telescopic collapse of said piston tube subassembly and the pressure of said working fluid in said secondary chamber being operative to effect sealing engagement between said integral lip and said metering pin during telescopic extension of said piston tube subassembly, and means defining a flow passage between said secondary throttling orifice and said primary throttling orifice, said working fluid being positively directed through said secondary throttling orifice during telescopic extension of said piston tube subassembly thereby to retard the rate of telescopic extension.

* * * * *